(12) United States Patent
Clarke

(10) Patent No.: US 6,358,446 B1
(45) Date of Patent: Mar. 19, 2002

(54) METHOD OF INJECTION MOULDING A FOAMED ARTICLE

(75) Inventor: Peter Reginald Clarke, Petworth (GB)

(73) Assignee: Coraltech Limited, Hampshire (GB)

( * ) Notice: Subject to any disclaimer, the term of this patent is extended or adjusted under 35 U.S.C. 154(b) by 0 days.

(21) Appl. No.: 09/284,189

(22) PCT Filed: Oct. 8, 1997

(86) PCT No.: PCT/GB97/02775

§ 371 Date: May 25, 1999

§ 102(e) Date: May 25, 1999

(87) PCT Pub. No.: WO98/16364

PCT Pub. Date: Apr. 23, 1998

(30) Foreign Application Priority Data

Oct. 11, 1996 (GB) .............................................. 9621193
Oct. 17, 1996 (GB) .............................................. 9621625
Mar. 21, 1997 (GB) .............................................. 9705952

(51) Int. Cl.[7] .............................................. B29C 44/02
(52) U.S. Cl. .............................. 264/50; 264/51; 264/572
(58) Field of Search .............................. 264/51, 328.7, 264/572, 50; 425/4 R; 249/142

(56) References Cited

U.S. PATENT DOCUMENTS

| | | | |
|---|---|---|---|
| 2,530,289 A | | 11/1950 | Cook |
| 3,028,284 A | * | 4/1962 | Reeves .................... 264/328.7 |
| 3,029,472 A | | 4/1962 | Fischer |
| 3,767,742 A | * | 10/1973 | Robin ...................... 264/328.7 |
| 3,793,415 A | * | 2/1974 | Smith ...................... 264/328.7 |
| 3,809,733 A | * | 5/1974 | Sandiford et al. ........ 264/328.7 |
| 3,825,637 A | * | 7/1974 | Robin ...................... 264/328.7 |
| 5,093,053 A | * | 3/1992 | Eckardt et al. ............. 264/572 |
| 5,547,621 A | * | 8/1996 | Naritomi .................... 264/51 |
| 5,656,215 A | * | 8/1997 | Eckardt et al. ............. 264/572 |
| 5,695,699 A | * | 12/1997 | Naritomi ................... 264/46.4 |
| 5,985,191 A | * | 11/1999 | Clarke ......................... 264/55 |

FOREIGN PATENT DOCUMENTS

| | | |
|---|---|---|
| EP | 0657267 | 6/1995 |
| FR | 2059818 | 6/1971 |
| FR | 2707549 | 1/1995 |
| GB | 1299512 | 12/1972 |
| GB | 1333427 | 10/1973 |
| GB | 1370075 | 10/1974 |
| JP | 57125026 | 8/1982 |

OTHER PUBLICATIONS

Patent Abstracts of Japan, vol. 6, No. 220 (M–169), Nov. 5, 1982.

* cited by examiner

*Primary Examiner*—Allan R. Kuhns
(74) *Attorney, Agent, or Firm*—Ware, Freesola, Van Der Sluys & Adolphson LLP

(57) ABSTRACT

A method of forming an article via injection of plastics material into a mould consisting in the steps of: providing a mould tool (11) defining in its closed state a mould cavity, the mould tool being adapted to be partially expandable from an injection volume (FIG. 2) for receiving a load of plastics material to a final, larger volume (FIG. 3) determining the finish formed shape of the article, the mould tool having at least one movable member (171, 172), which is adapted to be withdrawn to increase the volume of the mould cavity, the difference in the injection and final volumes being represented by a void exposed in the mould cavity when the movable member is withdrawn; closing the mould tool to delimit the injection volume; injecting into the injection volume a plastics material mixture comprising a basic polymer and a foam producing additive; withdrawing the movable member (171, 172) to allow the plastics material to take up the shape of the final volume; and opening the mould and ejecting the finish formed article; wherein the withdrawal is effected with substantially minimal delay on filling of the injection space, whereby rapid expansion foaming occurs into the void on the withdrawal.

35 Claims, 7 Drawing Sheets

METHOD OF INJECTION MOULDING A FOAMED ARTICLE

TECHNICAL FIELD

The present invention relates to a method of forming an article via injection of plastics material into a mould.

BACKGROUND OF THE INVENTION

It is known to expand a mould containing foamable molten plastics material. For instance, in U.S. Pat. No. 3,793,415, to A. G. Smith, assigned to ICI and applied for on Nov. 16, 1971, formation of articles having a foamed core is described. A foamable composition is injected into a mould to fill it without foaming. A skin forms against the inside surface of the mould. Movable inserts in the mould are retracted. This allows areas of the mould to foam. Alternatively, these areas are filled without foaming and the volume of the mould is enlarged by partial opening of the mould to allow the core of the moulding to foam. A variety of possible blowing agents is set out. This method is hereinafter referred to as "the ICI Method".

A more complex method is the TAF method, as described in Japanese patent No. 51-27266 to Ashani Dow Limited and applied for on Jul. 1, 1972. It addresses the then prevalent problem of exothermic blowing agents, namely that during injection of them with the plastics material into the mould, gas bubbles—in practice nitrogen since diazobonamide was the usual blowing agent—form close to the surface of the material and burst through the surface before it had frozen off against the mould. The TAF method addresses this by pressurising the mould with nitrogen so as to prevent foaming until the mould has been filled and a skin has formed against the inside surface of the mould. After injection the gas is vented, allowing foaming to start. The mould volume is expanded and the material foams to fill it. The advantage was blemish-free surfaces of the final product.

A similar process is described in British patent application No. 2,010,168 by USM Corporation, applied for on Dec. 12, 1978. Again a skin is formed against the inside surface of the mould.

In my International Application No. PCT/GB/96/01706, now published under No WO 87/03800, I described and claimed (as proposed to be amended):

A method of forming an article via injection of plastics material into a mould, the finish formed article having thin wall portion(s) and thick wall portion(s), the thick wall portion(s) being at least partially foamed, the method consisting in the steps of:

providing a mould tool defining in its closed state, between its cavity part and its core part, narrow gap portion(s) whose mould part gap is to be substantially reproduced in the thin wall portion(s) of the article and wide gap portion(s) whose mould part gap is less than the thickness of the thick wall portion(s) of the finish formed article;

closing the mould tool to define the narrow and wide gap portions;

injecting a plastics material mixture comprising a basic polymer and a foam producing additive into the mould tool;

allowing the plastics material mixture to at least substantially solidify in the narrow gap portions of the mould tool to produce the thin wall portions of the finish formed article;

withdrawing at least a portion of one part of the mould tool from the other part before the plastics material mixture has at least substantially solidified in the wide gap portion(s) of the mould tool to allow the mixture to expand by foaming and form at least some of the thick wall portion(s) of the finish formed article; and ejecting the article from the mould tool.

This method is hereinafter referred to as "My Original Method".

It is possible to work My Original Method in conjunction with the ICI Method. Indeed in my International Application No. PCT/GB96/01706 on My Original Method, there are described alternatives where movable mould parts are drawn back to allow local foaming from thick wall portions.

However these alternatives were not expected to produce finish formed articles with a foam structure different from that otherwise obtained in My Original Method, that is to say with a clearly perceptible skin and a foam structure, resembling that of conventional foam.

In developing My Original Method, with a view to making larger foamed sections, I designed the tooling described in respect of the first embodiment below and experienced the very surprising "rapid expansion foaming", by withdrawing the movable part very early in the moulding cycle.

SUMMARY OF THE INVENTION

According to my present invention there is provided a method of forming an article via injection of plastics material into a mould, the method consisting in the steps of:

providing a mould tool defining in its closed state a mould cavity, the mould tool being adapted to be partially expandable from an injection volume for receiving a load of plastics material to a final, larger volume determining the finish formed shape of the article, the mould tool having at least one movable member, which is adapted to be withdrawn to increase the volume of the mould cavity, the difference in the injection and final volumes being represented by a void exposed in the mould cavity when the movable member is withdrawn, closing the mould tool to delimit the injection volume, injecting into the injection volume a plastics material mixture comprising a basic polymer and a foam producing additive, withdrawing the movable member to allow the plastics material to take up the shape of the final volume and opening the mould and ejecting the finish formed article;

wherein the withdrawal is effected with substantially minimal delay on filling of the injection space, whereby rapid expansion foaming occurs into the void on the withdrawal.

The actual delay after which rapid expansion foaming will not occur will depend upon the individual article being formed and details of the moulding tool. Too long a delay will result in a coherent skin being formed against the movable member, which inhibits the foaming from occurring throughout the final volume of the mould cavity. It is possible that a thin skin, which ruptures and loses coherence on foaming, may be allowed to form against the movable member.

In terms of conventional injection moulding practice, wherein the injection phase of the moulding machine cycle comprises an injection/filing stages followed by a packing/holding stage, the holding stage is minimised, if not dispensed with entirely. The delay between the filling stage and withdrawal of the movable member need only be sufficiently long to allow closure of a shut-off valve between the injection barrel and the moulding tool and/or sufficiently long to allow solidification of the plastics material in the gate of the moulding tool to prevent return flow of the material out of the tool. Therefore the movable member can be withdrawn immediately after the shut-off or gate solidification.

In making a small article, such as a cosmetics cream jar, I draw back the movable member within less than a second after filling of the mould, i.e. after the injection screw has ceased forwards movement. I have withdrawn the movable member within half a second of filling. Typically I can withdraw within one or two tenths of a second of filling; and I envisage that I could withdrawn without any delay, with a shut-off valve being closed at the same time as withdrawal. I would not expect to experience the rapid expansion foaming if the withdrawal was delayed for appreciably more than a second, at least without the movable member being insulated. For larger mouldings, it may be that longer delays can be tolerated due to the thermal mass of molten plastics material.

It is my present understanding that the foam forms spontaneously on withdrawal, with the movable member exposing molten plastics material to the void. To encourage this, I provide that the "original thickness" dimension, from the surface of the movable member through the material to the portion of the mould tool on the opposite side of it, sufficiently large for the body of the material to retain its heats and for little cooling effect to be experienced at the movable member. This does not necessarily mean that this original, expanding thickness of the material cannot be thin in comparison with the thickness of the foam. I anticipate that it is possible to expand to at least the order of 5 times of the expanding thickness. Lesser expansion, for instance of the order of twice the expanding thickness is readily achievable. The expanding thickness can be of the same order of thickness as that of thin wall sections of other portions of the article which are not foamed.

Where, as described below, the foaming is against another portion of the article, which is not to be foamed, it should be thinner than the expanding thickness so that is solidified when the movable member is withdrawn from it. Typically this can be a third of the thickness of the expanding thickness.

This expanding thickness can be as thin as that of thin wall sections of the article which solidify before mould opening and without foaming—as taught in My Original Method. To further avoid the formation of a skin against the movable member, and to avoid stiction of it with the material, the surface of the movable member can be treated with a low friction material which inhibits conduction of heat from the melt to the member. Indeed, the member can advantageously be of material having less conductivity that metal, for example a ceramic material. Nevertheless, I do not rule out that a thin skin may form against the movable member, in for instance large mouldings taking a long time to fill.

I do not fully understand the rapid expansion foaming. It seems to be akin to the foaming which occurs in the mouth of a bottle of carbonated drink on uncontrolled release of its closure. Were it to be possible to measure this, I would expect the plastics material to be still liquid in the injection volume—or at least a portion of it against the movable member—when the movable member is withdrawn immediately on filling of the mould. Further I believe that foaming occurs spontaneously on withdrawal, filling the void without delay.

The rapid expansion foaming results in a closed cell structure in the finished article with surprising rigidity. I believe the cell structure to result from the combination of:

rapid expansion of gas bubbles forming the cells.

rapid stretching of the cell walls due to the rapid expansion, and rapid cooling of the cell walls due to the rapid adiabatic expansion of the gas bubbles.

The adiabatic expansion cools the gas, which acts endothermically to absorb heat from the cell walls. It may be that the cell walls solidify by this process, i.e. the latent heat of solidification being transferred to the endothermically expanding gas bubbles. Even if this effect does not completely solidify the foam, it significantly reduces the cooling time by comparison with that for a solid moulding of the same dimensions The most surprising feature of the rapid expansion foaming is the rigidity of the resultant cell structure. I believe this to result from the polymer molecules being straightened in the direction of stretching of the cell walls, with the result that the polymer chains are substantially multi-directionally oriented and locally parallel to the cell walls.

Naturally, the foamed region has a low density, which is to be expected. However, the surprising rigidity exhibits itself in the cell structure being much more rigid than foamed materials of comparable density. For instance I have formed an article of foamed polypropylene, which appears on handling to have a density of the same order as that of expanded polystyrene. Normally expanded polystyrene can be compressed to a marked extent between thumb and forefinger. No give at all is perceptible in my article. Indeed the material can barely be indented by thumb nail. The foamed material appears to be nearly as rigid as other portions of the article which are moulded solid.

The foam producing additive essentially comprises gas, such as carbon dioxide, in solution in the plastics material mixture. The gas may be introduced by use of a blowing agent or directly as described in my UK patent applications Nos. 97029771.1 and 9706682.3, respectively dated Feb. 13 and Apr. 2, 1997. These are still unpublished. However, the mechanism for producing a solution of gas in the plastics material mixture forms not part of this invention, which is concerned with production of articles using such solution.

Where the mould tool merely comprises two parts, which are so arranged as to be able to be partially opened without exposing the mould cavity, typically by being formed in the manner of a piston and cylinder; the withdrawal is effected by such partial opening, which creates the void in the mould cavity. I would expect the majority of mould tools to include an additional movable part, which extends into the mould cavity and is pulled back on withdrawal to create the void in the mould cavity.

The movable member can be arranged to be pulled back in the direction in which the foaming will occur. Alternatively, the movable member can be arranged to be pulled back transversely of the predominant foaming direction. Typically, when the movable member is an additional part, it will be a sleeve arranged to be withdrawn longitudinally, exposing a circumferential void into which the foaming occurs radially outwards. Also, I envisage that the foaming may occur radially inwards. It should be understood that where a direction of foaming is specified, it is the general direction of foaming into the void which is referred to as opposed to the precise direction movement of the individual bubbles.

It will normally be convenient to withdraw the additional movable part transversely of the mould split plane, conveniently with a hydraulic or pneumatic ram.

Particularly where the movable member is an additional movable part, it is conveniently arranged to be moved forward again on mould opening for eject of the finish formed article from the mould tool. This can be achieved both where the member is withdrawn in the direction of foaming and where the foaming is transverse of the direction of withdrawal.

Where the direction of foaming is transverse of the direction of withdrawal, the foaming can be against a mould face which was completely obscured by the additional movable part from the injection volume on injection. In this arrangement, the melt foams across the void and impinges on the face of the mould tool. Normally this will result in a virtually skinless surface; in that the cell walls at the mould face coalesce to form a continuous surface, by the skin has no appreciable depth and there is no appreciable gradation in cell size close to the skin—although the cells may amalgamate locally throughout the body of the foam. In this arrangement, there are two alternatives, either the additional movable part when advanced has no appreciable gap between itself and the face of the mould, whereby the foam crossed the void vacated by the part only; or alternatively, there is a gap between the movable part and the face and the foam crosses both the void and this gap.

In an alternative, the additional movable part does not obscure the gap beyond itself from the injection volume, whereby plastics material is injected at both sides of the movable member. According to the thickness of the injected material at the respective sides and the extent to which they are skinned, one will foam towards the other or both will foam towards each other. Preferably, the movable member will be insulated and/or friction coated to such extend and/or withdrawn sufficiently soon that the foam(s) will adhere to each other or the non-foamed material to which the foamed material expands.

Particularly where the movable part is a sleeve, it will normally be positioned for the foaming expansion to be radially outwards. This has particular advantage where higher material density is required internally, such as in a container requiring a closely defined inside or in a "cork" requiring a core to enable pulling with a cork screw.

Where the article is a structural item such as an automotive bumper or a building construction lintel, the movable part will preferably include at least one bar withdrawable to allow foaming to form a beam on a side of the article, which is not visible in use; whilst the opposite side is moulded without foaming to produce an appreciable skin with a visual surface.

Wherein the movable member extends within the space defining the finished formed shape and size of the article.

In designing the tooling described in respect of the first embodiment below, I invented another use for it, in that it can be used for injection blow moulding.

In conventional injection blow moulding, an injection moulded parason is formed as a first stage in one mould. The moulding is then indexed to a second cavity in the same machine, where it is inflated to the shape of the second mould by blowing gas into it. Alternatively, the parasons are transported in bulk to a bottling plant for instance where they are placed in a blowing machine, in which they are individually heated and then blown to shape in a mould. Both of these methods involve the use of a first cavity for moulding the parason and a separate second cavity for blowing of the parason.

In the injection blow aspect of my present invention, the parason is formed and a movable member is withdrawn to expose an extension to the cavity into which the parason is blown by gas pressure.

Thus according to second aspect of my present invention there is provided a method of forming an article via injection of plastics material into a mould, the method consisting in the steps of:

providing a mould tool defining in its closed state a mould cavity, the mould tool having a core part, a cavity part and an additional movable part whereby it is adapted to be partially expandable from an injection volume for receiving a load of plastics material to a final, larger volume determining the finish formed shape of the article, the additional movable part being adapted to be withdrawn to increase the volume of the mould cavity, the difference in the injection and final volumes being represented by a void exposed in the mould cavity when the movable part is withdrawn, the arrangement being such that there is a gap between the additional movable part when advanced and a cavity wall beyond the additional movable member remote from the injection volume, the gap being obscured from the injection volume when the additional movable part is advanced, the method including the steps of:

injecting a plastics material mixture comprising a basic polymer and a foam producing additive into the injection volume, withdrawing the additional movable part after partial solidification of the plastics material mixture to form a skin against this part, allowing the plastics material against the additional movable part to expand by foaming across the void including the gap, whereby the skin forms against the cavity wall.

The tool of the first embodiment has a further use, namely that which I originally envisaged, namely forming thick wall portions of foamed articles with a skinned outer wall.

Thus according to a third aspect of the invention there is provided a method of forming an article via injection of plastics materials into a mould, the method consisting in the steps of:

providing a mould tool defining in its closed state a mould cavity, the mould tool having a core part, a cavity part and an additional movable part whereby it is adapted to be partially expandable from an injection volume for receiving a load of plastics material to a final, larger volume determining the finish formed shape of the article, the additional movable part being adapted to be withdrawn to increase the volume of the mould cavity, the difference in the injection and final volumes being represented by a void exposed in the mould cavity when the movable part is withdrawn, the arrangement being such that there is a gap between the additional movable part when advanced and a cavity wall beyond the additional movable member remote from the injection volume, the gap being obscured from the injection volume when the additional movable part is advanced, the method including the steps of:

injecting a plastics material mixture comprising a basic polymer and a foam producing additive into the injection volume, withdrawing the additional movable part after partial solidification of the plastics material mixture to form a skin against this part, allowing the plastics material against the additional movable part to expand by foaming across the void including the gap, whereby the skin forms against the cavity wall.

BRIEF DESCRIPTION OF THE DRAWINGS

To help understanding of the invention, various specific embodiments thereof will now be described with reference to the accompanying drawings, in which.

BEST MODE FOR CARRYING OUT THE INVENTION

Figure 1:
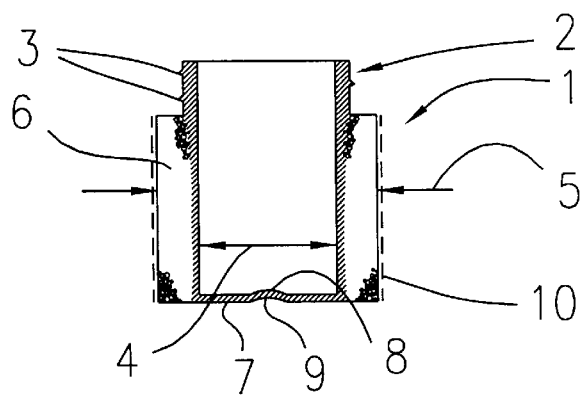
FIG. 1 is a cross-sectional side view of a jar made in accordance with the invention.

The jar shown in FIG. 1 has a bulbous body 1 with a smaller diameter neck 2 having screw threads 3 for a screw-top (not shown). As used for cosmetics, the volume of the jar as a container is much smaller—as defined by the diameter of its inner wall 4—than its overall volume—as defined by its outer diameter 5.

A conventional way of manufacturing a container with these dimensions is for the inner and outer walls to be separate injection mouldings, which are assembled together. This is a costly manufacturing process.

In accordance with the invention, the jar is integrally formed, with a thick, rapid expansion foamed outer wall 6, which is much thicker than the next 2 and a thin base 7 having a shallow punt 8 to accommodate an injection point 9. In use of the jar, the outer wall is covered with a shrink-wrap label 10, which forms no part of this invention.

Figure 2:
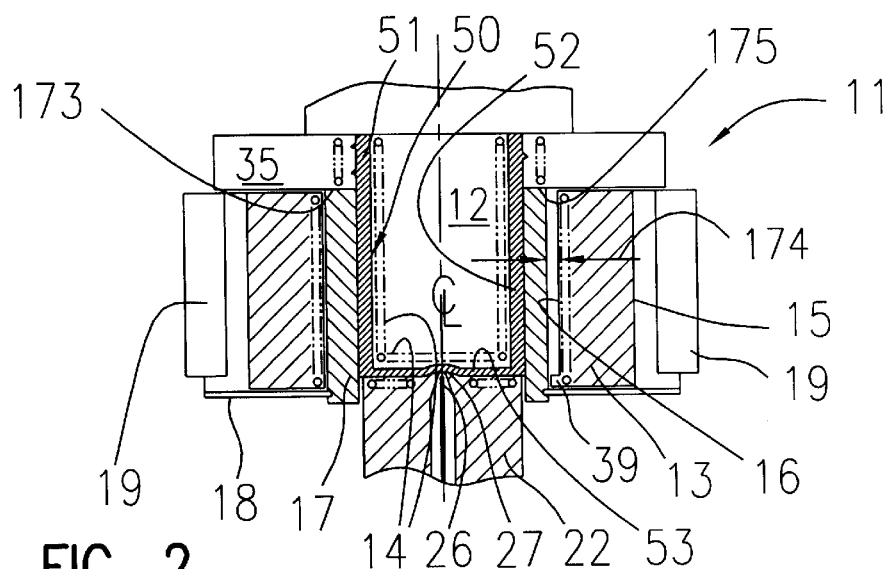
FIG. 2 is a similar cross-sectional view of the cavity region of a moulding tool in accordance with the invention for forming the jar of FIG. 1 in the injection step of the method tool is shown with two variants in respective right and left halves of the figure on opposite sides of the centre-line ¢.
Figure 3:
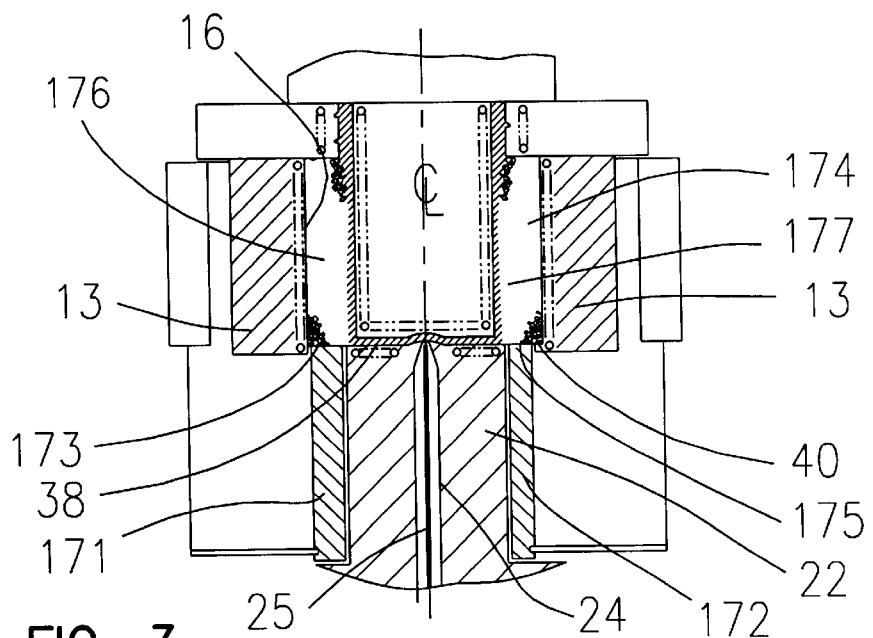
FIG. 3 is a similar view in an expansion step.
Figure 4:
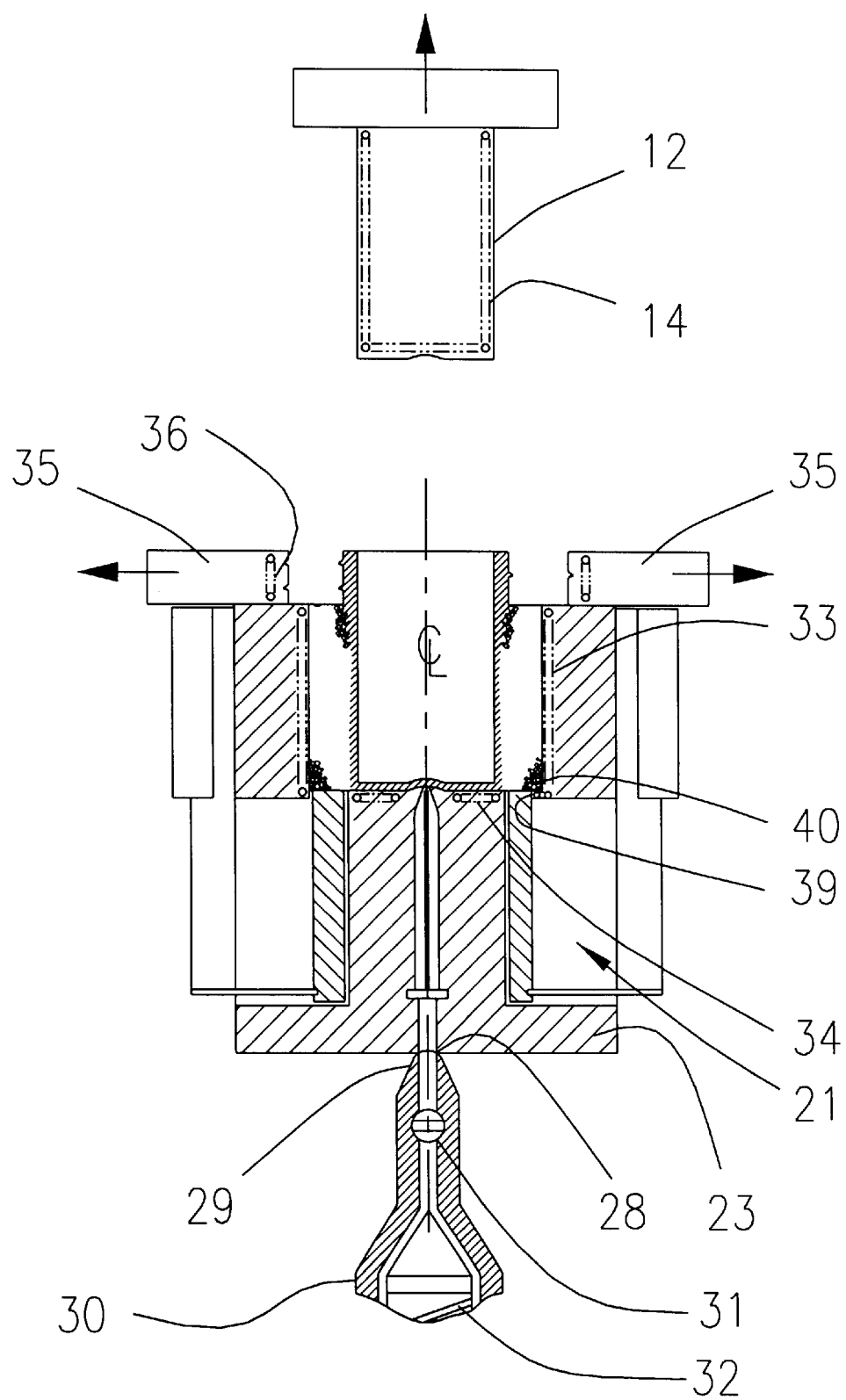
FIG. 4 is a similar, more extensive view of the moulding tool in an opening and ejection step.

Referring now to FIGS. 2, 3 and 4, the mould tool 11 in which the jar is made comprises a core part 12 and a cavity part 13. The core part is conventional and includes cooling water passages 14. The cavity part includes a block 15 with a cavity bore 16 for defining the diameter 5 of the jar. An axially withdrawable sleeve generally designated 17 and having two alternative configurations 171, 172 is arranged for movement in and out of the bore. For this, the sleeve is engaged in a plate 18 connected to two pneumatic actuators 19 under control of an injection moulding machine controller (not shown). The plate extends laterally through slots 21 (see FIG. 4) in the block. On the centreline ¢ of the block, opposite the core, a plug 22 is provided. It is an extension of an end portion 23 of the block and extends towards the cavity bore 16 to define the base of the cavity. The plug 22 has a runner bore 24, in which extends a hot runner tip 25 for defining a gate 26 at a dome 27 in the plug for the punt 8. At the opposite end from the dome, the plug has a recess 28 for mating with a standard nozzle 29 of the injection barrel 30 of the injection moulding machine, the nozzle having a shut-off valve 31 and the barrel having a plasticiser screw 32.

The sleeve 17 is a close sliding fit on the plug and in the block 15. Both the block 15 and the plug 22 have cooling water passages 33,34. By contrast, the sleeve 17 is uncooled, except by contact with the other components of the tool. Final cavity defining parts of the tool are radially parting neck defining plates 35, having cooling passages 36. Actuators (not shown) are provided for moving these plates. The core part 12 can be moved away from the cavity part 13 by the clamp mechanism (not shown) of the injection moulding machine.

The sleeve as configured 171 in the left hand side of the figures is a close sliding fit in the cavity bore 16, leaving no gap between itself and the bore. When advanced with the mould tool closed, the end 173 of the sleeve sealingly abuts the neck defining plates 35. When withdrawn, the end 173 is flush with the end 38 of the plug 22.

As configured on the right hand side of the figures, the sleeve 172 is thinner and defines an appreciable gap 174 with the bore 16 and the block has a inwards rim 39, in which the sleeve is close sliding fit. The cavity surface 40 of the rim is coplanar with the ends 38 of the plug. The end 175 of the thinner sleeve is in abutment with the neck plates when advanced and flush with the plug end 38 when withdrawn.

With the mould tool closed, the neck parts being moved in to abut each other, the core being abutted against them and the sleeve 17 being advanced to abut them from the other side, and injection volume 50 is provided in the tool. It comprises:

an annular neck portion 51 between the core 15 and the neck plates 35, which is filled and freezes off conventionally.

an annular expandable portion 52 between the core 15 and sleeve 17 and a base portion 53 between the core 15 and the plug 22.

When the sleeve is withdrawn, the expandable portion 52 is expanded in diameter to that of the bore 16. The two variants 171, 172 are essentially the same in this respect. With the variant 171, withdrawal of the sleeve exposes an annular void 176 which was entirely occupied by the sleeve and extends out to the bore 16. This void joins with the annular cavity portion 52 to increase the volume of the mould cavity on sleeve withdrawal. With the variant 172, withdrawal of the sleeve exposes a smaller annular void 177, which was entirely occupied by the sleeve, but does not extend out as far as the bore 16. However, the void 177 joins with the annular gap 174 to increase the volume of the mould cavity on sleeve withdrawal by the same amount, providing of course that the other dimension remain unchanged.

I expect to be able to achieve rapid expansion foaming with an initial injection volume to final volume thickness ratio of at least between two to one to five to one. In initial trials, a 3 mm thickness was expanded to 7 mm. The initial thickness was reduced to 1.7 mm and I expect to be able to reduce this further to 1.5 mm. This is the wall thickness of the neck 2. The latter remains unfoamed, even with relatively high concentrations of blowing agent Use of the mould tool will now be described to make the article shown in FIG. 1 will now be described. The mould is closed to delimit the injection volume to that of the neck portion 51 and the expandable portion 52. The shut-off valve 31 is opened and the injection screw 32 is advanced to fill the injection volume with a plastics material mixture comprising a basic polymer and a foam producing additive. Once the mould is filled, the conventional packing phase of the injection cycle is reduced to a minimum or dispensed with. The sleeve is then withdrawn to allow the plastics material to take up the shape of the final volume, i.e. the initial volume plus the extra, void volume exposed to the material by the sleeve withdrawal, by rapid expansion foaming into the void. Then, possibly after a short delay to allow cooling of the material, the mould is opened. The finish formed article is ejected from the cavity by advancing the sleeve.

For the cream jar described, I would not expect to delay sleeve withdrawal beyond one second after filling of the mould. To do so would risk a skin forming against the sleeve, such as to inhibit the rapid expansion foaming. The sleeve withdrawal can be timed to coincide with the expected timing of material freeze-off in the hot runner gate. Conveniently, the sleeve withdrawal can be timed to coincide with shut-off valve closure. Where a short packing phase is found desirable, a delay between filling and sleeve withdrawal of two to five tenths of a second should be adequate. I do not expect to have to provide a substantially longer delay for bigger articles, at least unless steps are taken to avoid cooling and skin solidification at the sleeve or tis equivalent.

Such steps include polytetrafluroethylene coating of the sleeve. Not only does this reduce frictional drag on withdrawal and any tendency for the plastics material to adhere to the sleeve, it also provides a degree of insulation between the sleeve and the plastics material. Alternatively heat conduction from the material by the sleeve to the cavity block can be reduced by forming the sleeve of ceramic material.

I have moulded the jar from polypropylene material, with commercially-available, endothermic, carbon dioxide blowing agents. However, I anticipate that I could have achieved similar results with other plastic materials and other foam producing additives.

Figure 5:
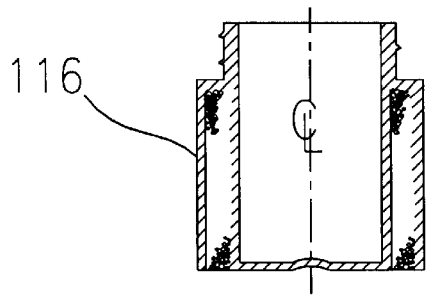
FIG. 5 is a similar view of another jar of the invention made in an alternative mould with a different wall configuration, which varies on opposite sides of the centre-line ¢.
Figure 6:
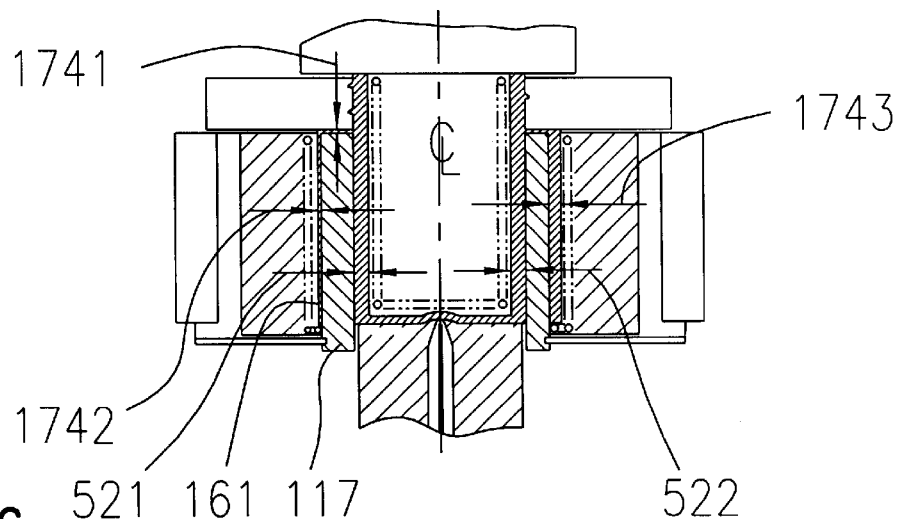
FIG. 6 is a similar cross-sectional view of the cavity region of the moulding tool of the invention for forming the jar of FIG. 5 in an injection step of the method, tool is shown with two variants in respective right and left halves of the figure on opposite sides of the centre-line ¢.

Turning now to the jar shown in FIG. 5 and its mould tool shown closed in FIG. 6, it includes an alternative whereby the rapid expansion foaming is against a separately moulded portion of the article. These figures, as with FIGS. 2 to 4, shown one variant on their left hand side and another on their right hand side. Referring to the left side first, the sleeve 117 is similar to the right hand side variant 172, except that it is shorter. Thus it does not abut the neck plates, leaving a space 1741, and puts the gap 1742 in communication with the injection volume. In fact both the space 1741 and the gap 1742 form part of this. Whereas shown the gap 1742 is thinner than the annular portion 521, the plastics material in former can freeze off to form a coherent outer wall 116 by contact with the cavity bore 161 as far as the sleeve 117; whilst the material in the injection volume portion 521 remains molten against the sleeve for rapid expansion foaming out to the wall 116 on sleeve withdrawal. This alternative has the advantage of providing an outer wall with a better finish for printing. By altering the thickness of the gap and/or the annular portion, the material can be caused to foam both inwards and outward, i.e. by making the thicknesses approximately equal, and indeed inwards only, i.e. by making the thickness of the gap greater than that of the annular portion. The right sides of FIGS. 5 and 6 show the latter alternative, wherein the annular portion 522 is thinner than the gap 1743. In these alternatives, early withdrawal of the sleeve can cause adherence of the material of the two portions of the article the position vacated by the sleeve.

The method of the invention is not restricted to artificially large diameter contains such as the cosmetics jar. For instance, it is particularly suitable for forming insulated vessels having a void between inner and outer skins. Further, it is envisaged that articles having no neck may be formed. Other a number of applications will now be briefly described.

Figure 7:
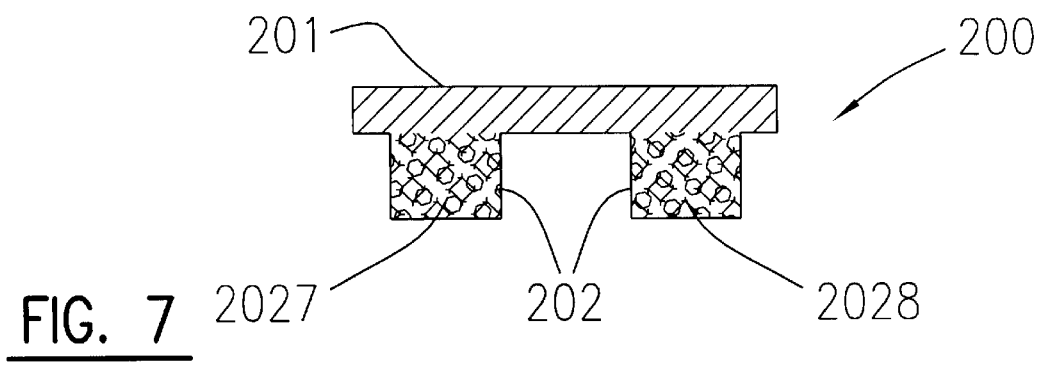
FIG. 7 is a cross-section side view of an automotive bumper in accordance with the invention.
Figure 8:
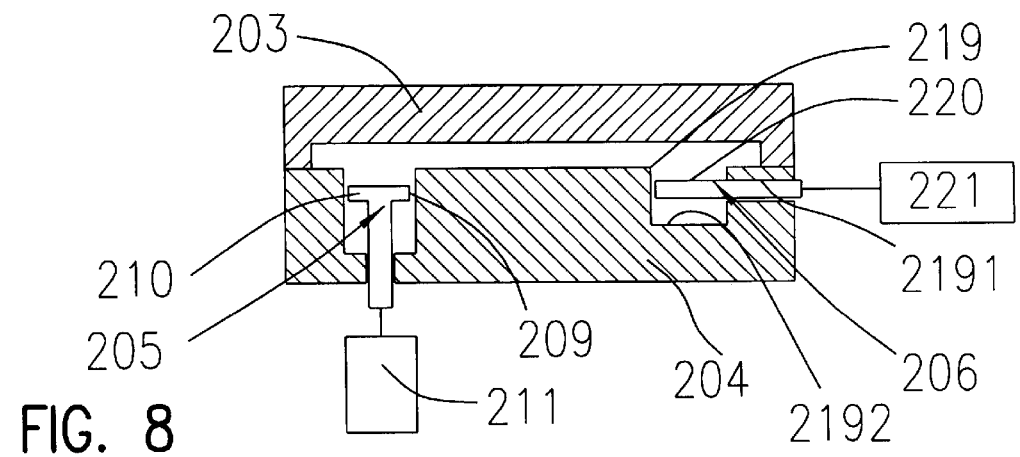
FIG. 8 is a diagrammatic, cross-sectional side view of a mould tool for the bumper of FIG. 7.

Turning now to FIGS. 7 and 8, there is shown diagrammatically in cross-section a beam such as an automotive bumper 200, with a front face 201 and two rear beams or flanges 202. In practice, the bumper would be contoured in two if not three dimensions and such can be incorporated without further invention. The mould for the beam is two part mould 203,204. The part 203 defines the outer, front face of the beam and in finished to a high cosmetic standard. The other part 204 defines the inner face, which need not be to such a high standard. It incorporates movable members 205,206 for allowing the formation rapid expansion foam flanges 2027,2028. The left hand flange—in the figures—is formed in a trough 209 extending longitudinally of the bumper and fitted with a movable bar 210. An actuator 211, or series of them, is arranged to move the bar from an advanced position close to the top of the trough to a withdrawn position at its bottom. On filling of the mould, the bar 210 is withdrawn and the foaming occurs in the direction of withdrawal. Advance again of the bar ejects the product after mould opening. The right hand flange is formed in a similar trough 219 also fitted with a withdrawable bar 220. This bar is accommodated in side channel 2191 off the trough and is arranged to be moved by actuator 221 from an advanced positioned closing off the trough to a withdrawn position opening the trough for rapid expansion foaming into it. With this arrangement, the foaming is transverse the direction of movement of the movable member causing it. Whilst this flange cannot be ejected by its movable member, the arrangement allows shaping of the bottom of the trough 2192, for instance to provide for fixture of the bumper in its use. It can be envisaged that either trough could be the full width of the bumper, to provide a beam across its full width.

Figure 9:
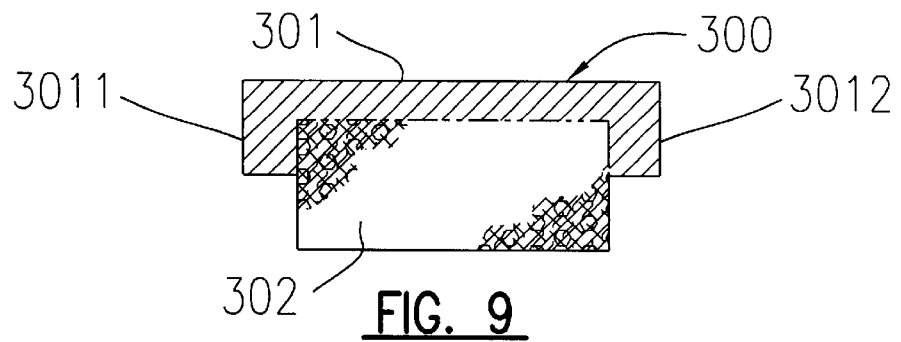
FIG. 9 is a view similar to FIG. 7 of another bumper in accordance with the invention.
Figure 10:
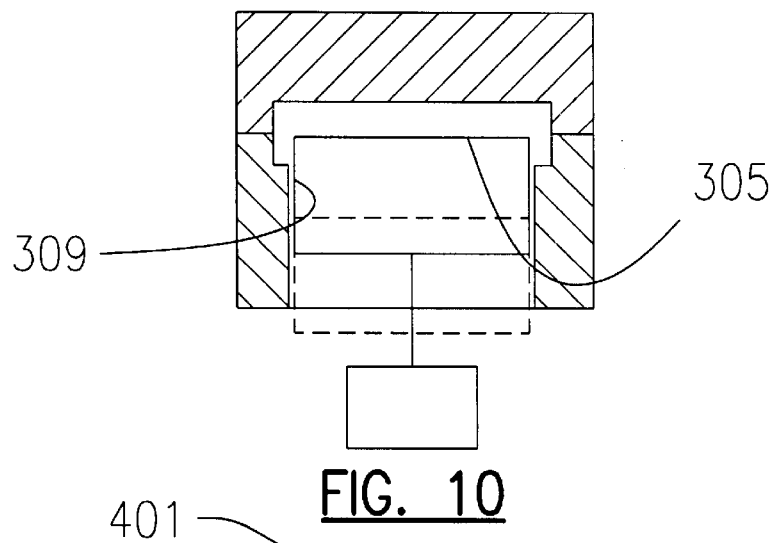
FIG. 10 is a view similar to FIG. 8 of a moulding tool for the bumper of FIG. 9.

As shown in the variant of FIGS 9 and 10, the cosmetic front face 301 can be returned at either or both edges 3011,3012 of the bumper 300, forming it as a channel with rapid expansion foaming filling the channel and creating a beam 302. In this arrangement, whilst the flange is formed in a trough 309, the movable member extends out of the trough during injection and is withdrawn into it for rapid expansion foaming.

Figure 11:
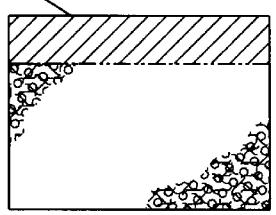
FIG. 11 is a similar view of a lintel in accordance with the invention.
Figure 12:
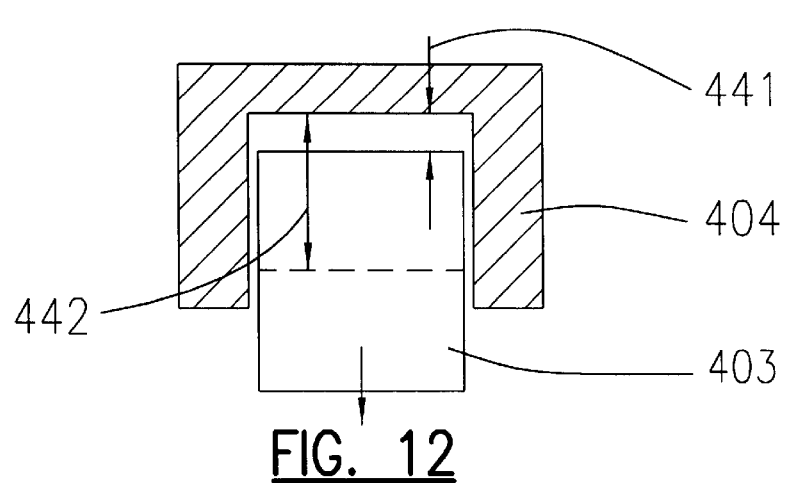
FIG. 12 is a similar view of a moulding tool for the lintel of FIG. 11.

Another similar structural product can be made using the invention as a single cosmetic face 401 lintel 400, which is shown in FIGS. 11 and 12. This simple product can be made in a mould configured as an elongate piston 403 and cylinder 404. The plastics material is injected with the mould closed to the extend of leaving only a small injection volume 441, with the piston member 403 inserted far into the cylinder member 404. On withdrawal for rapid expansion foaming, the two members are moved apart to an expanded volume 442 with the piston member only just engaged with the cylinder member 404. Then for ejection—using conventional means—the piston member is withdrawn completely from the cylinder member.

Figure 13:
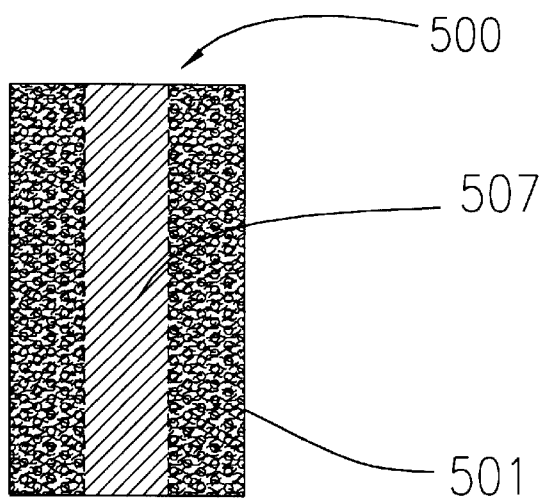
FIG. 13 is a central, cross-sectional side view of a "cork" in accordance with the invention.
Figure 14:
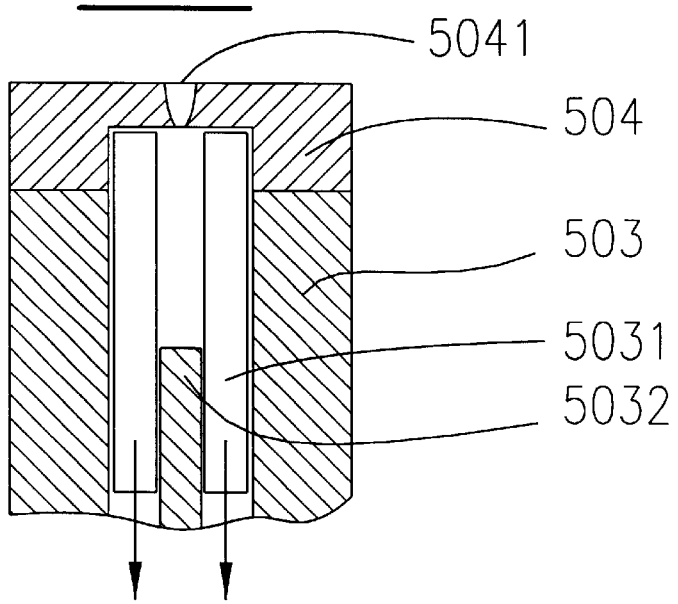
FIG. 14 is a diagrammatic, cross-sectional side view of a moulding tool for the "cork" of FIG. 13.

Referring now to FIGS. 13 and 14, the mould there shown is for making "corks" 500. The mould cavity 503 has a withdrawable sleeve 5031 and a central plug 5032. The other mould part 504 is in effect a top to the cavity and incorporates an injection gate 5041. The plastics material is injected into the initial cavity formed centrally of the sleeve between the plug 5032 and the top 504, with the sleeve bottomed against the top. The sleeve is dawn back to be flush with the plug for rapid expansion foaming and advanced again for ejection of the product. The resultant "cork" has a foamed outside 501 for sealing with the bottle and a dense core 507—from which the foam expanded—which is readily gripped by cork screw.

Figure 15:
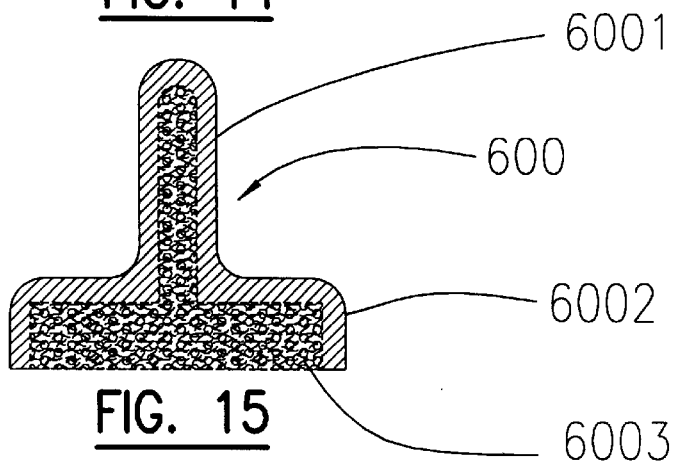
FIG. 15 is a central, cross-sectional side view of a paint brush handle in accordance with the invention.
Figure 16:
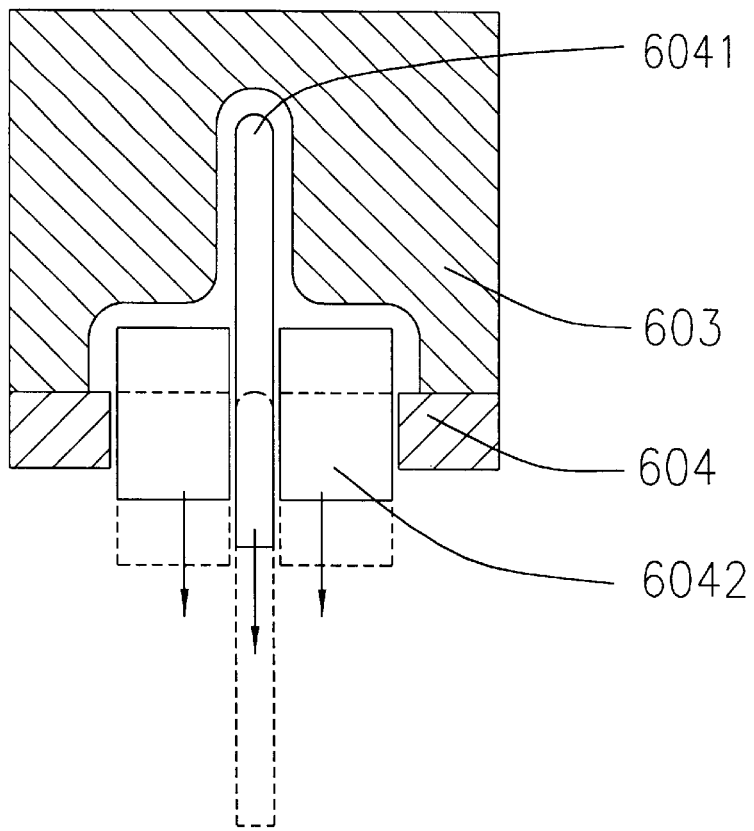
FIG. 16 is a diagrammatic, cross-sectional side view of a moulding tool for the paint brush handle of FIG. 15.

Referring now to FIGS. 15 and 16, the rapid expansion foam article there shown in a paint brush handle 600. It is foamed inwards in contrast to the "cork" 500. The mould cavity 603 provides the shape of the handle; the other mould part 604 is a closure for the cavity and carries two withdrawable members 6041,6042. The first is a rod 6041 arranged to extend far into the cavity and restrict in it in the grip region 6001 to having a thin injection thickness. The second withdrawable member 6042 is a block through which the rod extends, and which extends less far into the cavity in the region of the head 6002 of the handle to which the bristles are secured. Again the block creates a thin injection thickness in this region of the handle. The members are arranged to be withdrawn together by differing amounts by a lever mechanism (not shown) whereby their ends are flush on withdrawable with the end 6003 of the head 6002.

Figure 17:
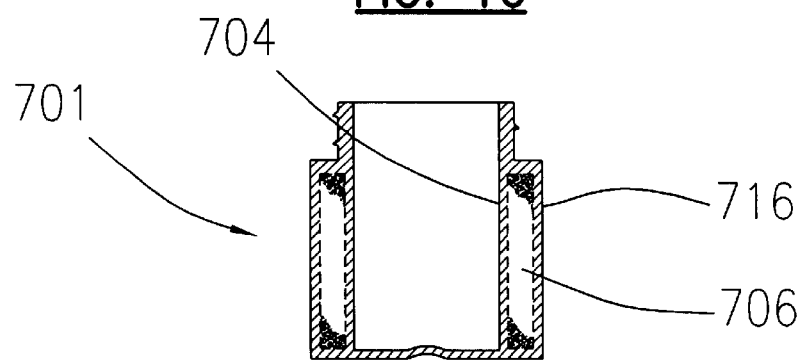
FIG. 17 is a cross-sectional side view of another jar in accordance with another aspect of the invention.

Referring now to FIG. 17, it shows another use for the tool of the first embodiment with the sleeve variant 173. Instead of withdrawing the sleeve before a skin has formed against it, a skin is allowed to form and the sleeve then withdrawn. This results in a skinned outer wall 716 to the bulbous body 701 with a foamed interior 706 between the outer wall and the inner wall 704. For certain applications, this double wall container, which is cheaper than a compound container of separate inner and outer mouldings, has advantage; particularly where thick walls with a considerable separation between them is needed as is made possible by expanding across a substantial void by use of a sleeve with a gap beyond it which is not connected to the injection volume.

Figure 18:
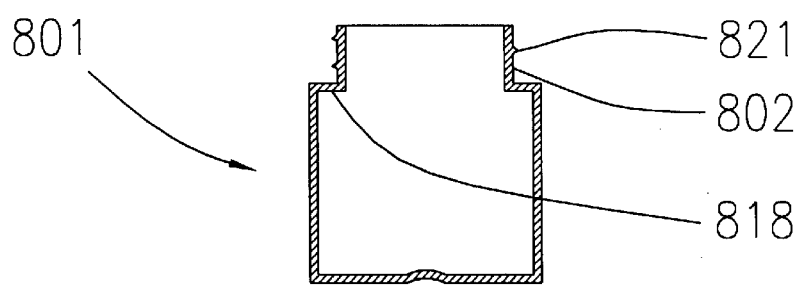
FIG. 18 is a cross-sectional side view of a jar made in accordance another aspect again of the invention.

Similarly to that shown in the first embodiment, the jar shown in FIG. 18 has a blown bulbous bod 801 with a smaller diameter neck 802. A conventional way of manufacturing such a jar is for a preform to be injection moulded and then transferred to another cavity into which it is blown to finished shape.

In accordance with this embodiment of the invention, the jar is preformed, and then the gas blowing step is carried out in the same mould tool.

Figure 19:
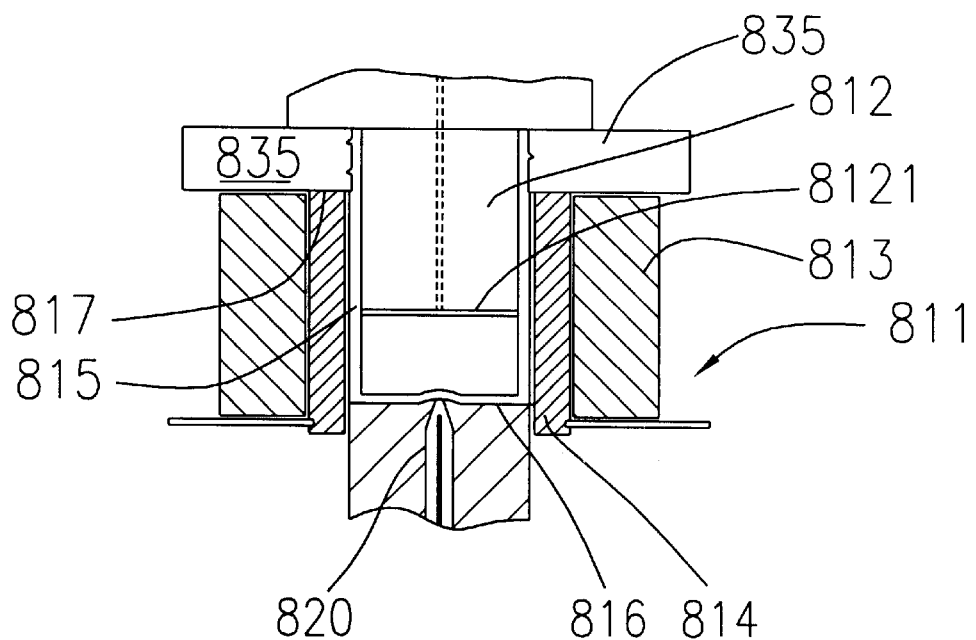
FIG. 19 is a cross-sectional view of a moulding tool for the jar of FIG. 18 in a preform injection step.
Figure 20:
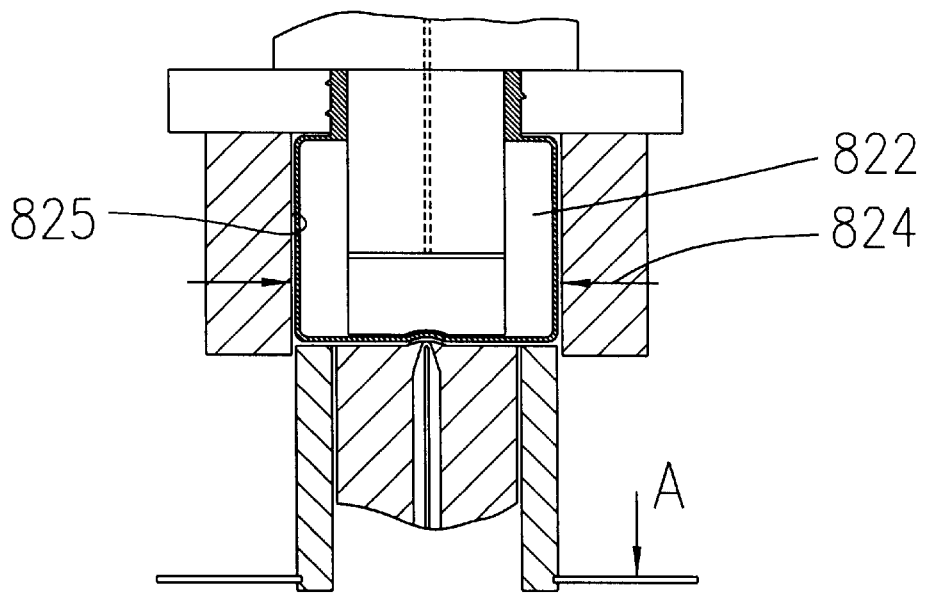
FIG. 20 is a similar view the tool in a gas blowing step.

Referring now to FIGS. 19 and 20, this mould tool 811 in which the jar is made comprises a core part 812—having an annular gas injection slit orifice 8121—and a cavity part 813. The core part is conventional. The cavity part has an axially withdrawable sleeve 814, which (together with the core part) defines in its advanced position for injection of plastics material an injection cavity 815 for the preform of the jar. This cavity, in which the initial step of formation of the body occurs, is limited as to its outside diameter by the sleeve 814, whilst the core part 812 determines the inside diameter. As conventionally, the neck and the base of the jar (at the end 816 of the core) are defined by the core part 812 and the static (until mould expansion) sleeve 814.

The withdrawable sleeve 814 has a distal end 817, which is contoured to abut neck plates 835 at the junction 818 of the body and the next of the jar so as to seal the plastics material of the preform into the cavity 815 when the sleeve is advanced. The end contour 817 is also incorporated into the base contour of the jar radially outwards of the base portion opposite the core end 816.

The sleeve is adapted to be axially stroked in the direction of the arrows A by an actuator (not shown) between the advanced position shown in FIG. 19 and the withdrawn position shown in FIG. 20.

Use of the mould tool in accordance with this embodiment of the invention will now be described. With the tool in its FIG. 19 state via an injection port 820 in the cavity part of the mould at the centre of the base, the plastics material in injected into the cavity 815. The neck of the jar is formed in the conventional manner, including cap fixture formations 821. In the body portion of the jar, that is around the core within the advanced sleeve, the material begins to solidify against these elements. Immediately after injection, decompression and valve closure, that is within approximately one third to one second after injection, the sleeve is withdrawn. At this stage, the material forming the body has skinned due to the partial solidification on the core and within the sleeve, but it is still sufficiently flexible to be able to be blown away from the core part of the mould. On release of blowing gas from the orifice, the preform is blown to the full diameter 824 of the cavity through both the space 822 initially occupied by the sleeve (and in a non-illustrated variant any space corresponding to the gap between the sleeve and the full diameter 824 of the body cavity radially of the sleeve.) The blowing gas forces the expanding perform against inside surface 825 of the cavity part. On contacting the wall, the preform cools and solidifies in shape of the body. The tool can then be opened and the finished jar ejected.

The space 822 defines an extension of the injection cavity 825 when the sleeve is withdrawn. The preform is forced through this extension. The surface 825 delimits the outline of the extension.

The advantage of the method my method is that the portion of the cycle time occupied in conventional gas blowing in swapping cavity portions of the mould tool is saved.

What is claimed is:

1. A method of forming an article via injection of plastics material into a mould, the method consisting of the steps of:
   providing a mould tool defining in its closed state a mould cavity, the mould tool being adapted to be partially expandable from an injection volume for receiving a load of plastics material to a final, larger volume determining the finish formed shape of the article, the mould tool having at least one movable member, which is adapted to be withdrawn to increase the volume of the mould cavity, the difference in the injection and final volumes being represented by a void exposed in the mould cavity when the movable member is withdrawn.

closing the mould tool to delimit the injection volume, injection into the injection volume a plastics material mixture comprising a basic polymer and a foam producing additive, withdrawing the movable member by means of an actuator which pulls back the movable member, in order to allow the plastics material to take up the shape of the final volume, and opening the mould and ejecting the finish formed article; wherein there is a delay between filing of the injection volume and withdrawing the movable member, and wherein the withdrawal is effected with substantially minimal delay on filling of the injection volume, whereby rapid expansion foaming occurs into the void on the withdrawal.

2. A method as claimed in claim 1, wherein the foaming is allowed to occur to such extent that polymer chains of the plastics material are substantially straightened with multidirectional orientation parallel to cellular walls of the foam formed by the rapid expansion foaming.

3. A method as claimed in claim 1, wherein the movable member is withdrawn immediately on shut-off valve closure.

4. A method as claimed in claim 1, wherein the movable member is withdrawn immediately on injection gate solidification.

5. A method as claimed in claim 1, wherein the movable member is withdrawn after a short holding pressure stage.

6. A method as claimed in claim 5, wherein the movable member is withdrawn within one second of filling of the injection space.

7. A method as claimed in claim 5, wherein the movable member is withdrawn within half a second of filling of the injection space.

8. A method as claimed in claim 5, wherein the movable member is withdrawn within two tenths of a second of filling of the injection space.

9. A method as claimed in claim 1; wherein the movable member is withdrawn immediately on filling of the injection space.

10. A method as claimed in claim 1, wherein the plastics material is liquid against the movable member, when the movable member is withdrawn on filling of the mould.

11. A method as claimed in claim 1, wherein the plastics material expands by rapid expansion foaming from an original thickness of the or a portion of the injection volume to a thickness in the range of twice to five times the original thickness.

12. A method as claimed in claim 1, wherein the rapid expansion foaming fills the void and reaches a cavity wall of the moulding tool.

13. A method as claimed in claim 12, wherein a virtually skinless foam surface forms against the cavity wall.

14. A method as claimed in claim 1, wherein the injection volume includes:

a first portion from which the rapid expansion foaming occurs and which has an original thickness from the surface of the movable member to the portion of the mould tool on the opposite side of it such that the injected material in it remains at least substantially liquid prior to the withdrawal and a second portion for moulding another portion of the article, which is thinner than the original thickness of the first portion, whereby its plastics material solidifies without foaming before the movable member is withdrawn from it, the first and second portions being separated by the movable member; and wherein the rapid expansion foaming occurs from the first portion and fills the void as far as the other portion of the article on withdrawal the movable member.

15. A method as claimed in claim 1, wherein the injection volume includes:

a first portion from which the rapid expansion foaming occurs and which has an original thickness from the surface of the movable member to the portion of the mould tool on the opposite side of it such that the material injected in it remains at least substantially liquid prior to the withdrawal and a second portion for forming another portion of the article, which also a thickness such the material injected in it remains at least substantially liquid prior to the withdrawal the first and second portions being separated by the movable member; and wherein the rapid expansion foaming occurs from the both portions towards each other and fills the void on withdrawal the movable member.

16. A method as claimed in claim 15, wherein the movable member is withdrawn sufficiently early for the plastics material from each portion to adhere to itself after rapid expansion foaming.

17. A method as claimed in claim 1, wherein the mould tool comprises two parts, one of which is movable with respect to the other and which are so arranged as to be able to be partially opened without exposing the mould cavity, as in the manner of a piston and cylinder; and wherein the withdrawal is effected by partial opening, which creates the void in the mould cavity and the rapid expansion foaming occurs in the direction of the withdrawal.

18. A method as claimed in claim 1, wherein the movable member of the mould tool comprises an additional movable part, which extends into the mould cavity; and wherein the withdrawal is effected by pulling back the additional movable part to create the void in the mould cavity.

19. A method as claimed in claim 18, wherein the rapid expansion foaming occurs in the direction of the withdrawal of the additional movable part.

20. A method as claimed in claim 18, wherein the rapid expansion foaming occurs transversely of the direction of the withdrawal of the additional movable part.

21. A method as claimed in claim 20, wherein the rapid expansion foaming fills the void and reaches a cavity wall of the moulding tool and there is no appreciable gap between the additional movable part when advanced and the cavity wall against which the rapid expansion foam forms, whereby the foam fills only the void vacated by the additional movable part and reaches the said cavity wall.

22. A method as claimed in claim 20, wherein the rapid expansion foaming fills the void and reaches a cavity wall of the moulding tool and there is a gap between the additional movable part when advanced and the cavity wall against which the rapid expansion foam forms, the gap being obscured from the injection volume when the additional movable part is advanced, whereby the foam fills the void vacated by the additional movable part and the gap and reaches the said cavity wall.

23. A method as claimed in claim 20, wherein the injection volume include:
   a first portion from which the rapid expansion foaming occurs and which has an original thickness from the surface of the moveable member to the portion of the mould tool on the opposite side of it such that the injected material in it remains at least substantially liquid prior to the withdrawal and
   a second portion for moulding another portion of the article, which is thinner than the original thickness of the first portion, whereby its plastics material solidifies without foaming before the movable member is withdrawn from it,
   the first and second portions being separated by the movable member,
   wherein the rapid expansion foaming occurs from the first portion and fills the void as far as the other portion of the article on withdrawal the movable member, and wherein there is a gap between the additional movable part when advanced and a cavity wall, the gap being in communication with the injection volume when the additional movable part is advanced, whereby plastics material is injected at both sides of the movable member and the rapid expansion foam fills the void vacated by the additional movable member on its withdrawal.

24. A method as claimed in claim 20, wherein the additional movable part is a sleeve arranged to be withdrawn longitudinally, exposing a circumferential void into which the foaming occurs rapidly inwards or outwards.

25. A method as claimed in claim 18, wherein the additional movable part includes at least one bar withdrawable to allow the rapid expansion foaming to form a beam on a side of the article and the opposite side of the bar is preferably moulded without foaming to produce a coherent skin.

26. A method as claimed in claim 18, wherein the additional movable part is arranged to be withdrawn transversely of a mould tool split plane.

27. A method as claimed in claim 18, wherein the additional movable member has a friction reducing and/or thermal insulation coating to inhibit adherence of the plastics material to it.

28. A method as claimed in claim 18, wherein the additional movable member is of a material having a lower thermal conductivity than metal to inhibit adherence of the plastics material to it.

29. A method as claimed in claim 18, wherein the finish formed article is ejected from the mould tool by forwards movement of the additional movable part on mould opening.

30. A method as claimed in claim 1, wherein the mould tool defines in its closed state, between two parts, narrow gap portion(s) whose mould part gap is to be substantially reproduced in thin wall portion(s) of the article and wide gap portion(s) whose mould part gap is less than the thickness of the thick wall portion(s) of the finish formed article, whence the rapid expansion foaming occurs; and wherein the plastics material mixture has at least substantially solidified in the narrow gap portions of the mould tool before this is opened, to produce the thin wall portion(s) of the finish formed article.

31. A method as claimed in claim 20, wherein the injection volume includes:
   a first portion from which the rapid expansion foaming occurs and which has an original thickness from the surface of the movable member to the portion of the mould tool on the opposite side of it such that the material injected in it remains at least substantially liquid prior to the withdrawal and
   a second portion for forming another portion of the article, which also has a thickness such that the material injected in it remains at least substantially liquid prior to the withdrawal
   the first and second portions being separated by the movable member,
   wherein the rapid expansion foaming occurs from the both portions towards each other and fills the void on withdrawal the movable member; and
   wherein there is a gap between the additional movable part when advanced and a cavity wall, the gap being in communication with the injection volume when the additional movable part is advanced, whereby plastics material is injected at both sides of the movable member and the rapid expansion foam fills the void vacated by the additional movable member on its withdrawal.

32. The method of claim 1, wherein the movable member is treated with a low friction material which inhibits conduction of heat to the movable member, and wherein the movable member comprises material having less conductivity than metal.

33. The method of claim 1, wherein the delay between filling of the injection space and withdrawing the movable member and also the substantially minimal delay during which the withdrawal is effected are sufficiently brief so that foaming occurs throughout the void exposed in the mould cavity, resulting in a foamed region substantially having at least as much rigidity as other portions of the article which are moulded solid.

34. A method of forming an article via injection of plastics material into a mould, the method consisting of the steps of:
   providing a mould tool defining in its closed state a mould cavity, the mould tool being adapted to be partially expandable from an injection volume for receiving a load of plastics material to a final, larger volume determining the finish formed shaped of the article, the mould tool having a movable part or member, which is adapted to be withdrawn to increase the volume of the mould cavity, the difference in the injection and final volumes being represented by a void exposed in the mould cavity when the movable member is withdrawn,
   closing the mould tool to delimit the injection volume,
   injecting into the injection volume a plastics material mixture to produce a preform of the article,
   withdrawing the movable member by means of an actuator which pulls back the movable member,
   introducing gas under pressure into the preform to expand it through the void to the final volume,
   venting the gas after preform expansion and
   opening the mould and ejecting the finish formed article, wherein there is a delay between filling of the injection volume and withdrawing the movable member.

35. A method of forming an article via injection of plastics material into a mould, the method consisting of the steps of:
   providing a mould tool defining in its closed state a mould cavity, the mould tool having a core part, a cavity part and an additional movable part whereby it is adapted to be partially expandable from an injection volume for receiving a load of plastics material to a final, larger volume determining the finish formed shape of the article, the additional movable part being adapted to be withdrawn to increase the volume of the mould cavity, the difference in the injection and final volumes being represented by a void exposed in the mould cavity when the movable part is withdrawn, the arrangement being such that there is a gap between the additional movable part when advanced and a cavity wall beyond the additional movable member remote from the injection volume, the gap being obscured from the injection volume when the additional movable part is advanced, the method including the steps of:

injecting a plastics material mixture comprising a basic polymer and a foam producing additive into the injection volume, withdrawing the additional movable part after partial solidification of the plastics material mixture to form a skin against this part by means of an actuator which pulls back the additional movable part, and allowing the plastics material against the additional movable part to expand by foaming across the void including the gap, whereby the skin forms against the cavity wall, wherein there is a delay between filling of the injection volume and withdrawing the additional movable part.

* * * * *

UNITED STATES PATENT AND TRADEMARK OFFICE
CERTIFICATE OF CORRECTION

PATENT NO. : 6,358,446 B1
DATED : March 19, 2002
INVENTOR(S) : Peter Reginald Clarke It is certified that error appears in the above-identified patent and that said Letters Patent is hereby corrected as shown below:

Column 1,
Line 16, "mould" should be -- moulding --.
Line 23, "Ashani" should be -- Asahi --.
Line 42, "87/03800" should be -- 97/03800 --.

Column 2,
Line 63, "filing" should be -- filling --.

Column 3,
Line 5, "the" should be deleted.
Line 13, "withdrawn" should be -- withdraw --.
Line 27, "heats" should be -- heat --.
Line 48, after "material" -- , -- should be inserted.
Line 50, "that" should be -- than --.

Column 4,
Line 1, after "cell" "." should be -- , --.
Line 13, after "dimensions" -- . -- should be inserted.
Line 64, after "mould" -- tool -- should be inserted.

Column 5,
Line 13, "by" should be -- but --.
Line 20, "crossed" should be -- crosses --.
Line 30, "extend" should be -- extent --.
Line 39, before "core" -- strong -- should be inserted.

Column 7,
Line 25, "mould" should be -- moulding --.
Line 67, "next" should be -- neck --.

Column 8,
Line 46, "ends" should be -- end --.
Line 57, "." should be -- , --.

Column 9,
Line 17, after "agents" -- . -- should be inserted.
Line 47, "tis" should be -- its --.

UNITED STATES PATENT AND TRADEMARK OFFICE
CERTIFICATE OF CORRECTION

PATENT NO. : 6,358,446 B1
DATED : March 19, 2002
INVENTOR(S) : Peter Reginald Clarke It is certified that error appears in the above-identified patent and that said Letters Patent is hereby corrected as shown below:

Column 10,
Line 13, "outward" should be -- outwards --.
Line 34, after "is" -- a -- should be inserted.

Coumn 11,
Line 6, "extend" should be -- extent --.
Line 44, "173" should be -- 172 --.
Line 57, "bod" should be -- body --.

Column 12,
Line 24, after "state" -- , -- should be inserted.
Line 47, "825" should be -- 815 --.
Line 67, after "drawn" "." should be -- , --.
Line 67, after "withdrawn" "." should be -- , --.

Column 13,
Line 2, "injection" should be -- injecting --.
Line 10, "filing" should be -- filling --.
Line 40, after "claim 1" ";" should be -- , --.
Line 49, after "thickness of" "the or" should be deleted.

Column 14,
Line 18, after "also" -- has -- should be added, and after "such" -- that -- should be added.
Line 25, after "withdrawal" -- of -- should be added.

UNITED STATES PATENT AND TRADEMARK OFFICE
CERTIFICATE OF CORRECTION

PATENT NO.    : 6,358,446 B1
DATED         : March 19, 2002
INVENTOR(S)   : Peter Reginald Clarke It is certified that error appears in the above-identified patent and that said Letters Patent is hereby corrected as shown below:

<u>Column 15,</u>
Line 4, "include" should be -- includes --.
Line 31 "rapidly" should be -- radially --.

<u>Column 16,</u>
Line 44, "shaped" should be -- shape --.

Signed and Sealed this

Fifteenth Day of April, 2003

JAMES E. ROGAN
*Director of the United States Patent and Trademark Office*